March 10, 1925.                                                    1,528,814
H. D. CHURCH
HYDROCARBON MOTOR
Filed May 29, 1919
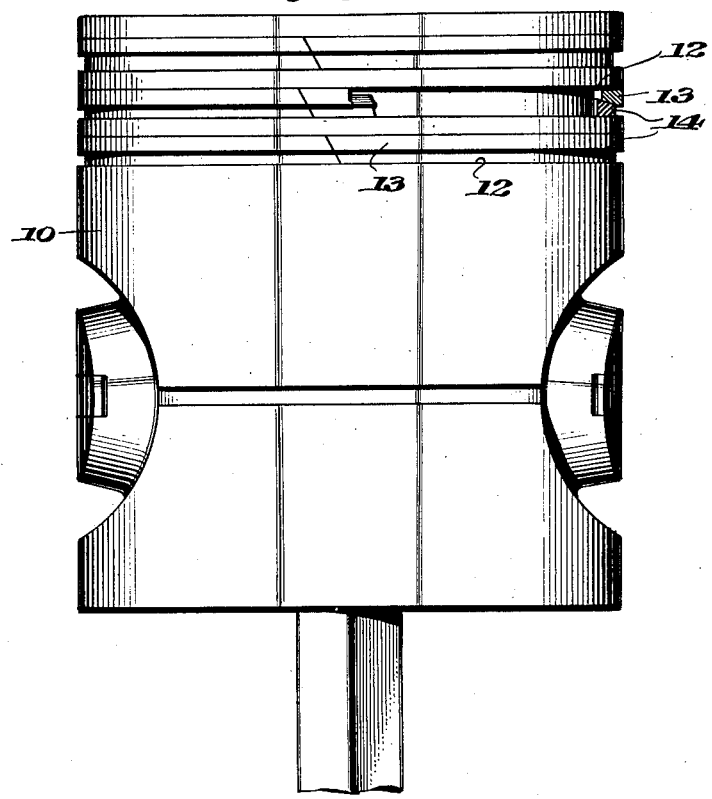
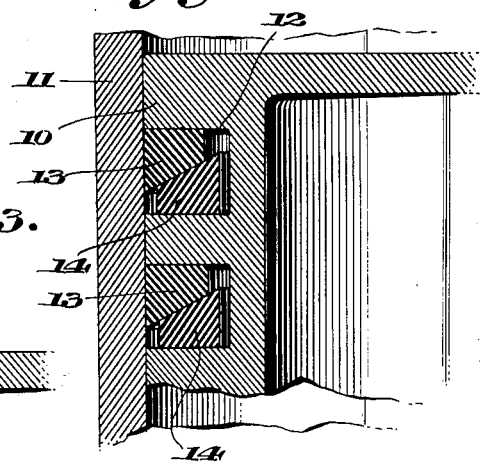
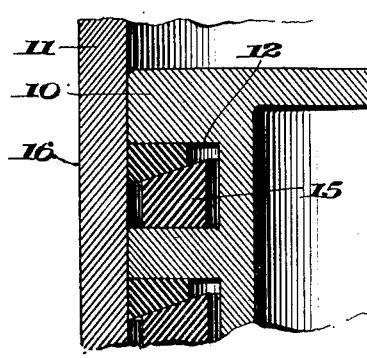
INVENTOR
Harold D. Church,
BY
Milton Sittille, ATTORNEY Patented Mar. 10, 1925.

1,528,814

UNITED STATES PATENT OFFICE.

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

Application filed May 29, 1919. Serial No. 300,691.

*To all whom it may concern:*

Be it known that I, HAROLD D. CHURCH, a citizen of the United States, and resident of Detroit, Wayne County, State of Michigan, have invented certain new and useful Improvements in Hydrocarbon Motors, of which the following is a specification.

This invention relates to hydrocarbon motors and particularly to piston rings for such motors.

The principal object of the invention is to provide means for counteracting the inertia forces against the piston ring at the ends of the stroke of the piston so as to thereby prevent separation of the rings from the walls of the grooves of the piston.

Another object of the invention is to provide a two piece piston ring in which contact of the outer ring against the wall of the cylinder and walls of the piston groove is constantly maintained.

With these objects and others in view the invention is embodied in preferable form in the construction hereinafter described and illustrated in the accompanying drawings, in which:

Fig. 1 is a side view in elevation of a piston showing three piston rings in place with the middle ring broken away and shown in section at the right hand of the figure.

Fig. 2 an enlarged vertical detail section through the upper part of the piston and part of a cylinder showing two of the rings in the grooves, and Fig. 3 a view similar to Fig. 2, showing a modified form of ring.

Referring to the drawings, 10 indicates a piston and 11 indicates a cylinder in which said piston is adapted to move. Formed in the piston are the usual circumferential grooves 12, within which are mounted the resilient piston rings. Referring to one of these piston rings, the same consists of two annular pieces having outer and inner peripheral flat surfaces and inclined contacting surfaces whereby the two pieces are adapted to ride one upon the other, with one member forcing the other against the cylinder wall and against the wall of the groove of the piston. Referring to these parts, 13 is an outer piece constituting a contact member and 14 is an inner piece constituting an expander member. The faces of the two members, which are in contact with each other are inclined to a plane normal to the axis of the piston. This angle is preferably less than forty degrees, the angle in Figure 2 being thirty degrees and in Figure 3 twenty degrees. The respective members are made of such peripheral widths as to just fill the groove of the piston when the piece 14 has its outer peripheral surface spaced behind the outer surface of the member 13. In this arrangement only the piece 13 is in contact with the wall of the cylinder and hence such member acts as the sealing part of the ring, while the part 14 not being in contact with the cylinder wall is free to exert an expansive action against the outer element 13. This expansive action would be destroyed were the member 14 permitted to come into contact with the cylinder wall.

It has been discovered that the piston rings at the ends of the stroke of the piston are subjected to such an inertia force as to tend to separate the rings from the wall of the groove, thus permitting the passage of gas past the ring. Thus with a three inch bore motor, at 1200 R. P. M., the force required to stop and start the piston ring at the end of the stroke runs up to nine pounds and this pressure is very much increased as the speed increases. In my invention, in order to obtain sufficient pressure in a ring of this type to overcome the inertia forces, not only is the upper piece of the ring arranged so as to be the only piece of the ring which bears against the cylinder wall, but also it is made with an initial radial pressure very much less than the final radial pressure desired. The lower member of the ring which does not come in contact with the cylinder wall is made with a very heavy radial pressure and such that, after the pressure has been divided into its two components, namely the force exerted in a radial direction and that in a longitudinal direction owing to the angular contact between the two parts of the ring, the radial pressure on the outer, upper piece of the ring will be stepped up to the desired degree of pressure against the cylinder wall while the other component acting longitudinally of the piston will be sufficient to slightly more than overcome the inertia forces of the two parts of the ring combined, and would thus hold the parts closely against the walls of the groove.

The difference in pressure between the two rings is in part obtained by the necessarily greater compression of the lower part to a shorter radius than that of the upper part in fitting the ring to the piston and if it is necessary to further increase the expansive strength of the lower inner piece to obtain sufficient pressure to overcome the inertia forces, this may be done by making the expander ring of tempered steel while the sealing ring may be made of cast iron. Fig. 2 illustrates a ring constructed on the above principle.

In Fig. 3 is shown a modification in which the heavy pressure of the expander ring as compared with the light initial pressure of the contact piece is obtained by making the expander member 15, of greater cross section than the contact part 16. This increase in cross section may be both radial and longitudinal. This arrangement obtains the same result as shown in Fig. 2, namely that of preserving the expansive force of the inner member by separating it from the cylinder wall, and of imposing a heavy pressure against the outer piece, thus preserving a tight contact with the cylinder and at the same time exerting a pressure longitudinally of the piston, equal to or greater than the inertia forces of the ring.

Having thus described my invention, what I claim and desire to secure by Letters Patent is:

A piston ring comprising an outer split ring member in contact with the cylinder and with one wall of the piston groove, and an inner member in contact with the opposite wall of the piston groove and with the outer member, said inner member having greater cross section and relatively heavier expansive capacity than the outer member, and said members having coacting faces inclined at an angle of approximately thirty degrees to a plane normal to the piston axis.

In testimony whereof I affix my signature.

HAROLD D. CHURCH.